(12) United States Patent
Storgato et al.

(10) Patent No.: US 10,106,062 B2
(45) Date of Patent: Oct. 23, 2018

(54) MOTOR VEHICLE SEAT PROVIDED WITH A SYSTEM FOR SUPPLYING CONDITIONED AIR

(71) Applicant: C.R.F. Societa Consortile per Azioni, Orbassano (Turin) (IT)

(72) Inventors: Angelo Storgato, Orbassano (IT); Giorgio Masoero, Orbassano (IT)

(73) Assignee: C.R.F. Societa Consortile Per Azioni, Orbassano (Turin) (IT)

(*) Notice: Subject to any disclaimer, the term of this patent is extended or adjusted under 35 U.S.C. 154(b) by 353 days.

(21) Appl. No.: 14/874,551

(22) Filed: Oct. 5, 2015

(65) Prior Publication Data

US 2016/0096460 A1    Apr. 7, 2016

(30) Foreign Application Priority Data

Oct. 7, 2014   (EP) .................................... 14187862

(51) Int. Cl.
   *B60N 2/56*    (2006.01)
(52) U.S. Cl.
   CPC ......... *B60N 2/5642* (2013.01); *B60N 2/5621* (2013.01); *B60N 2/5628* (2013.01); *B60N 2/5657* (2013.01); *B60N 2/5692* (2013.01)
(58) Field of Classification Search
   CPC ... B60N 2/5621–2/5664; B60N 2/5642; B60N 2/565; A47C 7/742–7/746
   See application file for complete search history.

(56) References Cited

U.S. PATENT DOCUMENTS

| | | | |
|---|---|---|---|
| 4,923,248 A | 5/1990 | Feher | |
| 5,626,387 A * | 5/1997 | Yeh ........................ | A47C 7/744 297/180.11 |
| 6,478,369 B1 | 11/2002 | Aoki et al. | |
| 6,511,125 B1 * | 1/2003 | Gendron ................ | A47C 7/742 297/180.11 |
| 6,687,933 B2 * | 2/2004 | Habboub ............... | B60N 2/242 297/452.42 |
| 7,070,232 B2 * | 7/2006 | Minegishi ................ | A47C 7/18 297/180.14 |

(Continued)

FOREIGN PATENT DOCUMENTS

| | | |
|---|---|---|
| DE | 19804100 | 5/1999 |
| DE | 10241571 | 3/2004 |

(Continued)

OTHER PUBLICATIONS

Search Report for European Patent Application No. 14187862 dated Mar. 19, 2015, 5 pages.

*Primary Examiner* — David R Dunn
*Assistant Examiner* — Tania Abraham
(74) *Attorney, Agent, or Firm* — RMCK Law Group PLC

(57) ABSTRACT

In a motor-vehicle seat a padding body of a cushion and/or backrest has a passage for air coming from an air conditioning system of the motor-vehicle. This passage includes a closed cavity defined between a lowered surface formed in an outer surface of the padding body and the seat cover. At least part of the closed cavity is separated from the cover through a layer of a material substantially impervious to air, configured to exchange heat by thermal conduction, through the cover with a body of an occupant.

9 Claims, 17 Drawing Sheets

(56) References Cited

U.S. PATENT DOCUMENTS

Figure 1:
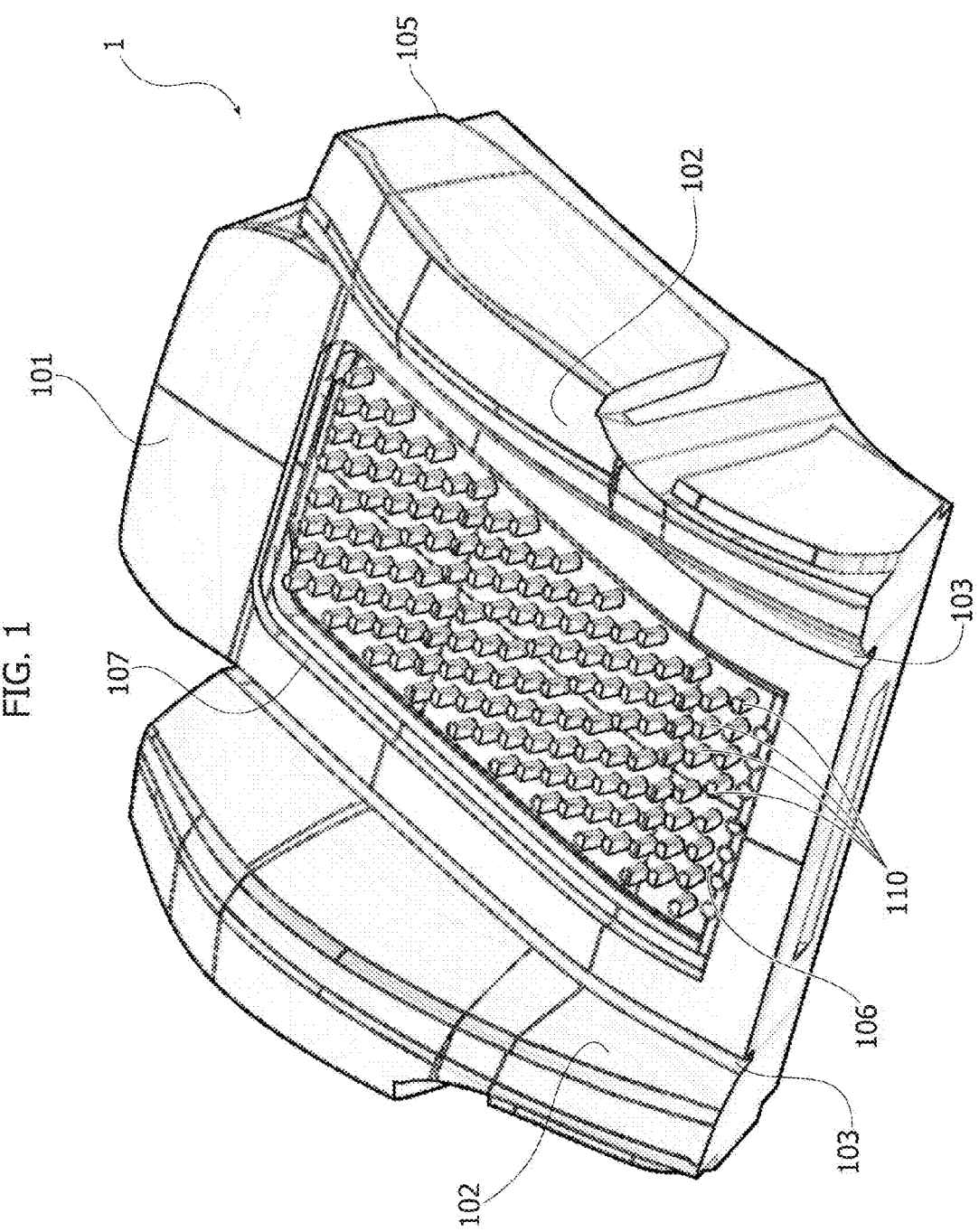

| | | | | |
|---|---|---|---|---|
| 7,461,892 B2 * | 12/2008 | Bajic | ................... | A47C 7/72 |
| | | | | 297/180.1 |
| 7,695,062 B2 * | 4/2010 | Stowe | .................. | B60N 2/5621 |
| | | | | 297/180.1 |
| 9,096,158 B2 | 8/2015 | Herbst | | |
| 2002/0189016 A1 | 12/2002 | Habboub | | |
| 2006/0273646 A1 * | 12/2006 | Comiskey | ................ | A47C 7/74 |
| | | | | 297/408 |

FOREIGN PATENT DOCUMENTS

| | | |
|---|---|---|
| DE | 102008038380 | 2/2010 |
| DE | 102009057072 | 6/2011 |
| EP | 1454790 | 9/2004 |
| FR | 2894010 | 6/2007 |
| JP | 5139155 | 6/1993 |
| WO | 9605475 | 2/1996 |

\* cited by examiner

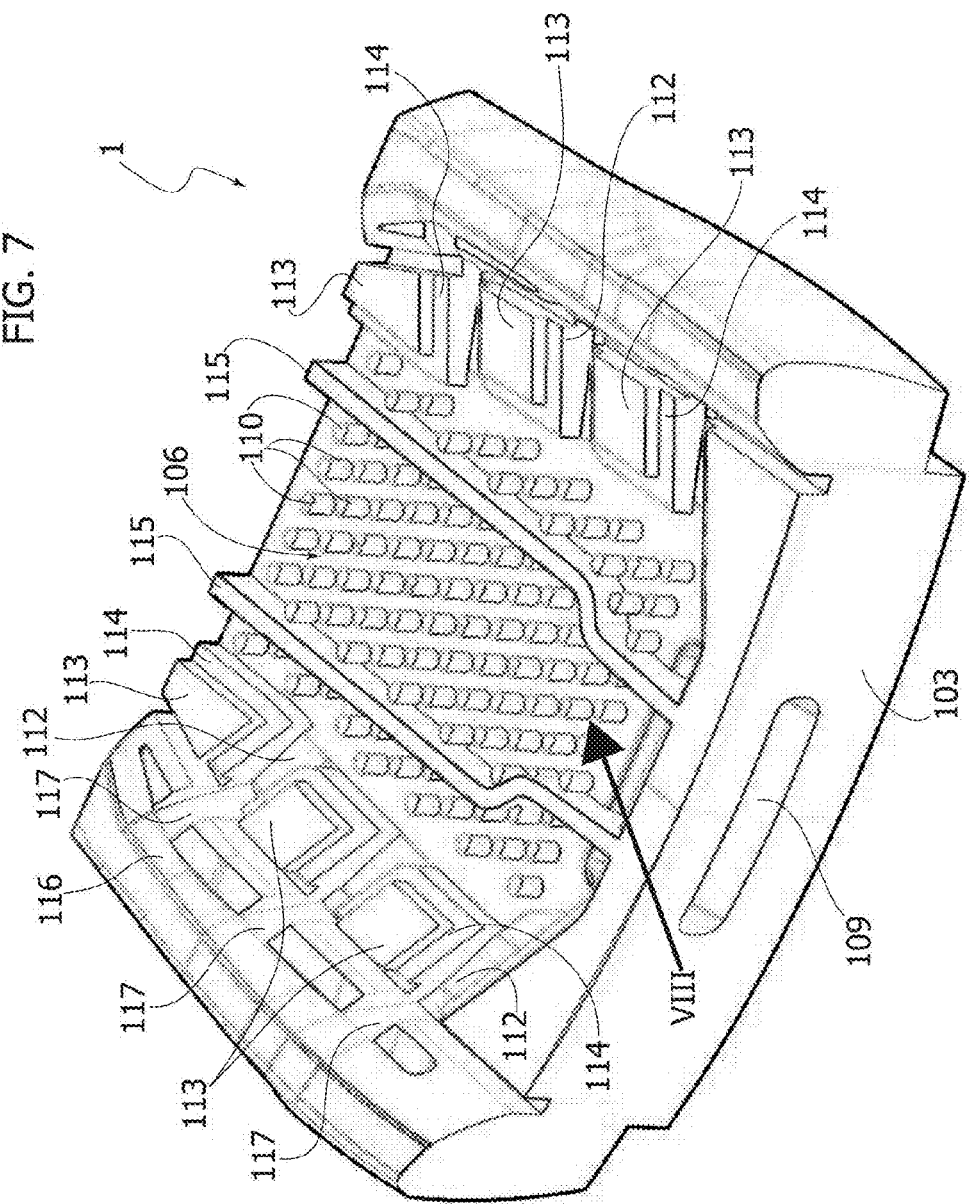

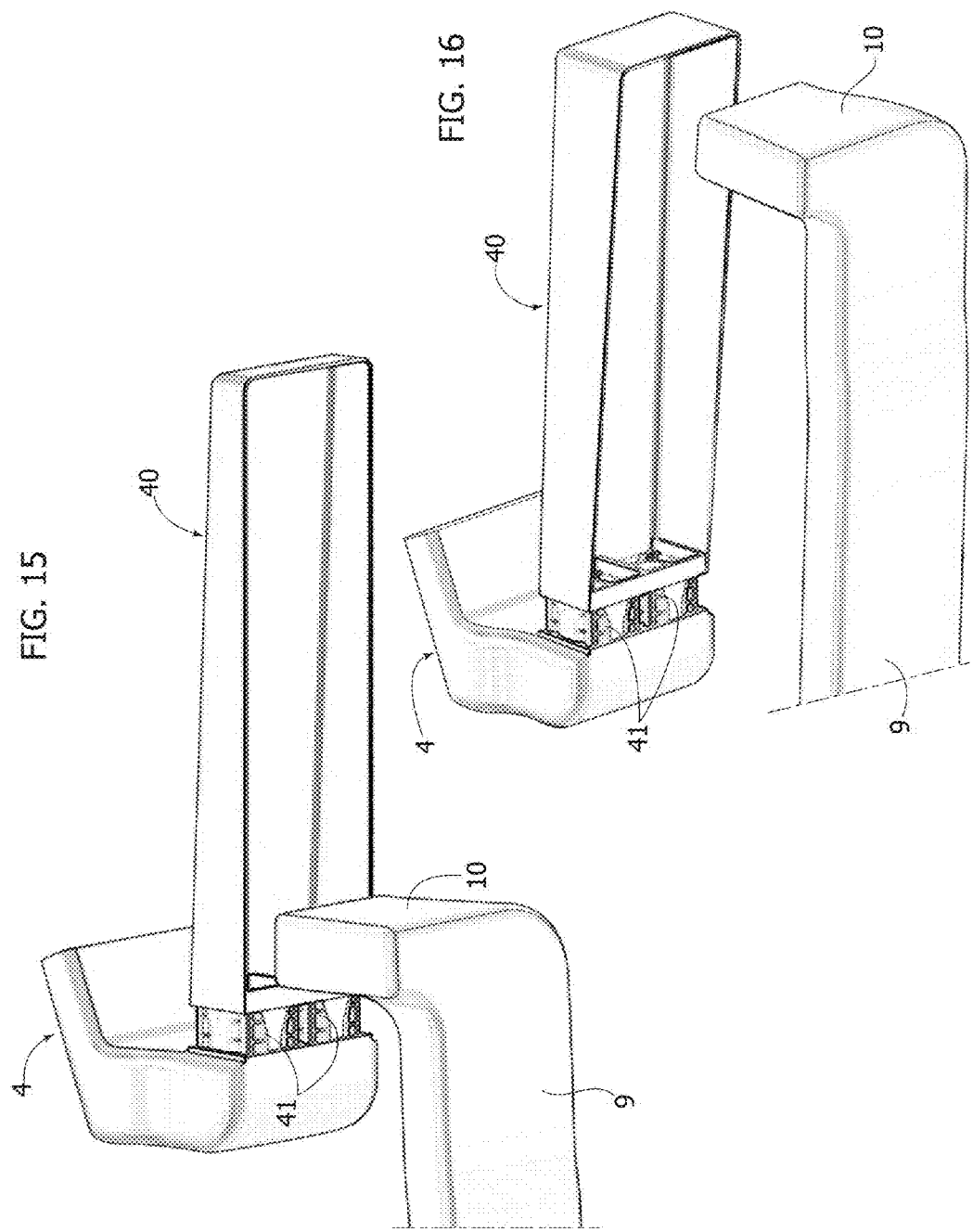

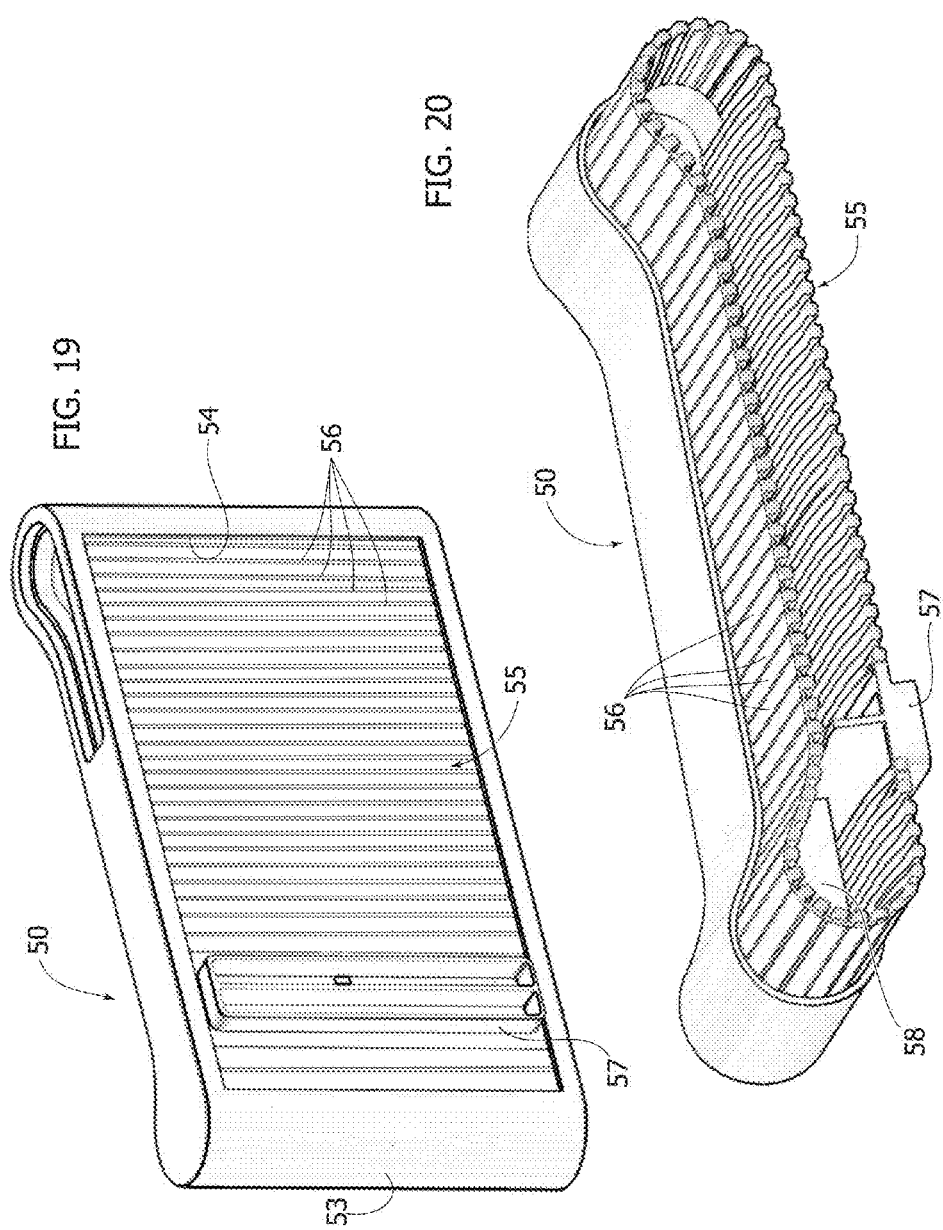

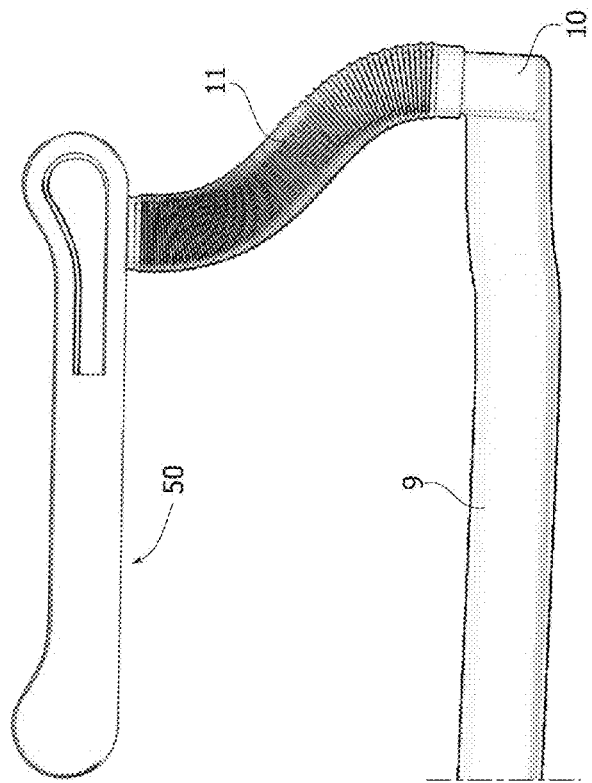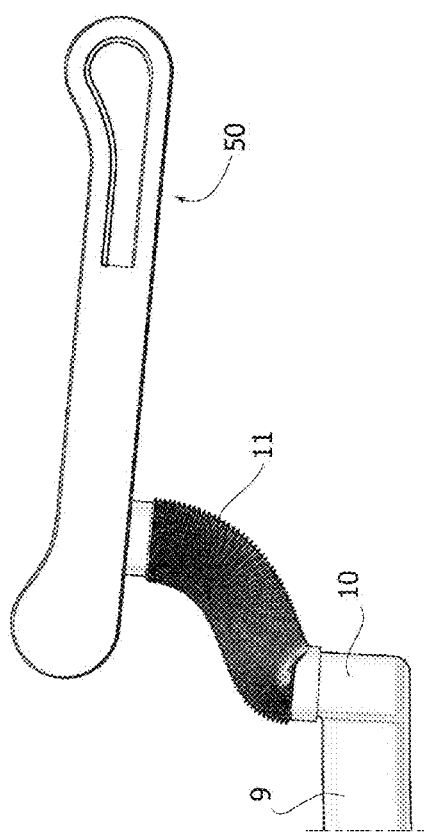

MOTOR VEHICLE SEAT PROVIDED WITH A SYSTEM FOR SUPPLYING CONDITIONED AIR

CROSS REFERENCE TO RELATED APPLICATIONS

This application claims priority to European Patent Application No. 14187862.9 filed on Oct. 7, 2014, the entire disclosure of which is incorporated herein by reference.

FIELD OF THE INVENTION

The present invention relates to motor vehicle seats, of the type comprising a seat cushion and a seat backrest, wherein each of said seat cushion and said seat backrest comprises a padding body made of foamed plastic material and a cover applied over said padding body, and wherein within the padding body of at least one of said seat cushion and seat backrest a passage is formed for an air flow coming from the air conditioning system of the motor-vehicle.

PRIOR ART

According to the prior art, seats of the above indicated type make use of air coming from the motor vehicle air conditioning system for cooling or heating the body of the occupant. To this end, the passage formed in the padding body for the air flow coming from the air conditioning unit of the vehicle leads to channels for supplying air jets outwardly from the seat through the seat cover, which air jets flow over the body of the occupant in order to bring or remove heat. The same effect is obtained in some known solutions by drawing air into the seat, rather than by pushing air out of the seat. In any case, the prior art exploits a heat exchange by convection between the air flow and the body of the occupant.

A further problem which is encountered in the seats of the above indicated type is that of ensuring the connection between the air guiding system provided inside the seat with the air conditioning system of the motor vehicle in all the adjustment positions of the seat with respect to the motor vehicle floor. As a matter of fact, in general the seat is provided at least with a system for adjustment of the position along the longitudinal direction of the motor-vehicle and often also with a system for adjustment of the height relative to the floor. Known solutions to this specific problem are disclosed in documents JP-A-H05139155, U.S. Pat. No. 6,478,369 B1 and FR-A-2 894 010.

OBJECTS OF THE INVENTION

The main object of the present invention is that of providing a motor-vehicle seat provided with a novel system for cooling/heating the body of the occupant which ensures an efficient heat exchange with the body of the occupant and at the same time is characterized by a simple and inexpensive structure.

A secondary object of the invention is that of achieving the above indicated purpose by providing a system which is simple and functional and which ensures communication of the air guiding system provided within the seat with the air conditioning system of the motor-vehicle at any adjustment position of the seat relative to the motor-vehicle floor.

SUMMARY OF THE INVENTION

In view of achieving the above indicated primary object, the invention provides a motor-vehicle seat having the features which have been indicated at the beginning of the present description and further characterized in that said passage for the air flow coming from the air conditioning system of the motor-vehicle comprises a cavity defined between said cover and a lowered surface portion formed in the outer surface of the padding body, and in that at least part of said cavity is separated from the cover by a layer of a material which is substantially impervious to air, said layer being adapted to exchange heat by thermal conduction, through said cover, with the body of the occupant.

Therefore, the present invention starts from the novel concept of providing a heat exchange with the body of the occupant without the need of having air flowing over the body of the occupant, but rather by a thermal conduction in the contact between the body of the occupant and a seat surface. In other words, in the present invention the air flow coming from the air conditioning system of the motor-vehicle which is supplied inside the seat is not pushed through the seat cover towards the body of the occupant, but rather remains sealed within the cavity of the padding body and is exploited simply for heating or cooling the layer of air-impervious material which exchanges heat by conduction, through the seat cover, with the body of the occupant.

The invention is naturally applicable both to the cushion and to the backrest of a motor-vehicle seat.

In the preferred embodiment, said lowered surface has a plurality of supporting projections on which a spacing fabric with a three dimensional mesh is supported, said fabric having an outer layer which constitutes the above mentioned layer of material which is substantially impervious to air.

In a first example, the layer of substantially air-impervious material covers the entire extension of said lowered surface.

In an improved alternative solution, the layer of material substantially impervious to air covers a central portion of said lowered surface. In this case this latter surface also includes lateral portions formed in lateral portions of the padding body on which the cover is applied with the interposition of layers of a material which is pervious to air, so that part of the air flow supplied within said cavity comes out from the lateral portions of the seat through said pervious layers and through the cover (which is typically made of a fabric or other material pervious to air).

Therefore, in this case a hybrid solution is obtained, with a heat exchange by conduction at the central portion of the seat and having air jets coming out of the lateral portions of the seat for ensuring a direct ventilation on the body of the occupant. This ventilation is for example useful in the hot season for eliminating the transpiration of the body of the occupant.

In a further embodiment, said layer which is substantially impervious to air has a plurality of holes for passage of air, for generating localized air jets.

According to a further aspect, the invention provides a motor-vehicle seat having the above indicated features and further characterized in that said cavity of the padding body is connected to the air conditioning system of the motor-vehicle through an air supplying line which extends from the air conditioning system of the motor-vehicle to an outlet mouth located above the floor panel of the motor-vehicle and under the motor-vehicle seat. This outlet mouth communicates to an air supplying line carried by the seat, which extends from an inlet mouth located under the seat to said cavity formed in the padding body. The outlet mouth located above the motor-vehicle floor panel and the inner mouth located under the seat are in fluid communication with each other by means of an auxiliary connecting system which maintains this communication in the different adjustment position of the seat relative to the floor panel.

In a first solution, the outlet mouth located above the motor-vehicle floor panel and the inlet mouth located under the seat are not connected mechanically to each other, said auxiliary connecting system comprising a suction hood device associated to said inlet mouth. In a first exemplary embodiment of this solution, said hood device comprises a closed casing with a lower wall facing the outlet mouth and having two inlet apertures provided with respective suction fans, said apertures being spaced apart from each other along the longitudinal direction of the motor-vehicle to an extent such that at least one of these apertures is located in proximity of said outlet mouth whatever is the position of longitudinal adjustment of the seat.

In a second embodiment of the solution with suction hood, the hood device has an opened lower side, facing the outlet mouth and having a longitudinal extensions sufficient to remain above said outlet mouth with a portion thereof at any position of longitudinal adjustment of the seat, at least one suction fan being provided at one end of the hood device which communicates with said cavity formed in the padding body of the seat.

In one embodiment which is alternative to that with suction hood, said outlet mouth is connected by means of a flexible and extendable duct to said inlet mouth. The latter is defined by a sleeve element movable longitudinally along a lower flat wall of a hollow casing, said sleeve element being associated to a wall in form of a roll-up shutter slidably mounted along an endless path within said casing. In a preferred exemplary solution, said casing has an inner cavity divided by a longitudinal partition into two chambers arranged side by side which are communicated respectively to a cavity formed in the padding body of the seat cushion and to a cavity formed in the padding body of the seat backrest.

Due to said features, the seat according to the invention is able to ensure a proper supply of conditioned air to the seat in any adjustment position of the seat, with simple and functional means.

DESCRIPTION OF SOME EMBODIMENTS

Figure 2:
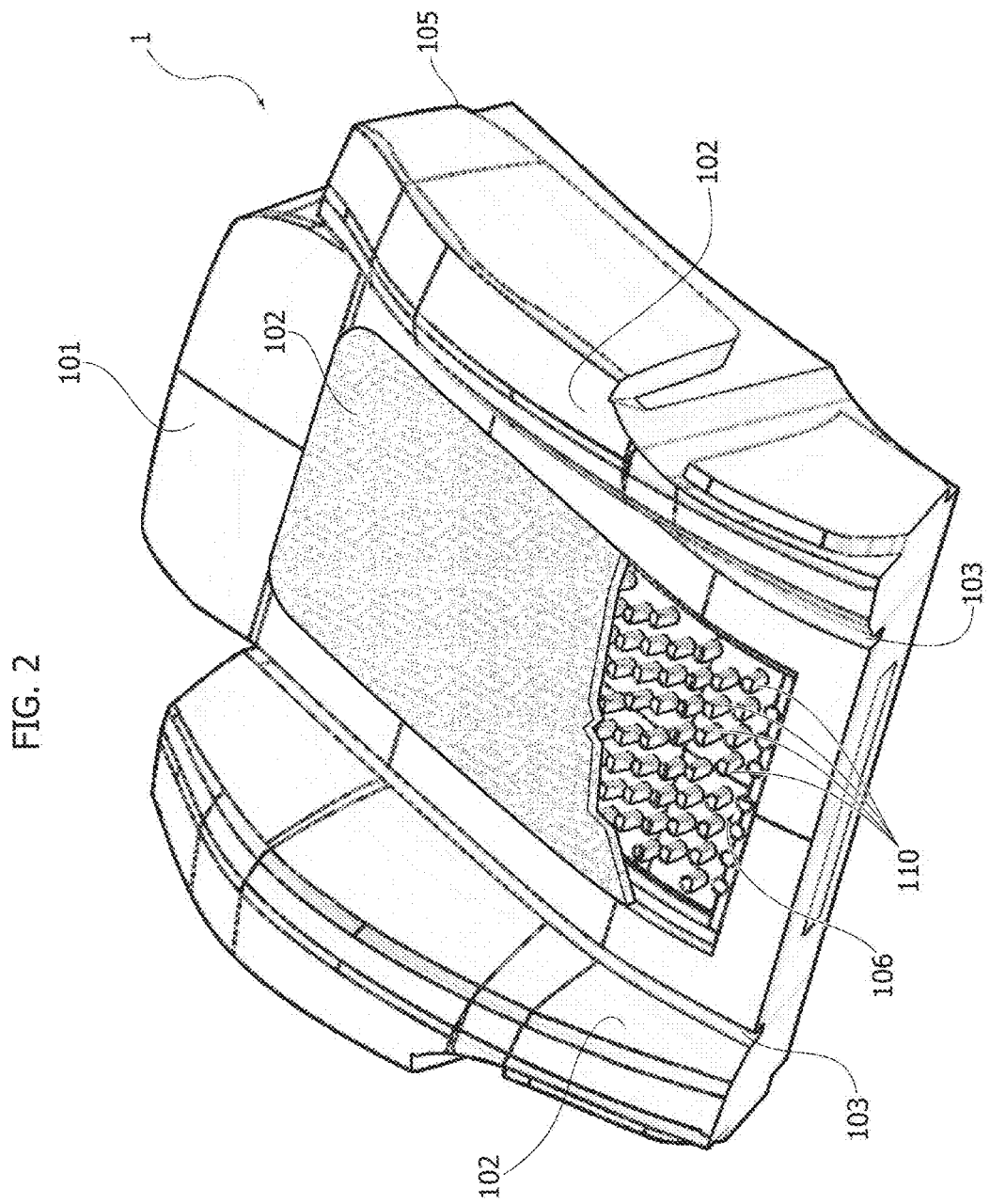
Figure 3:
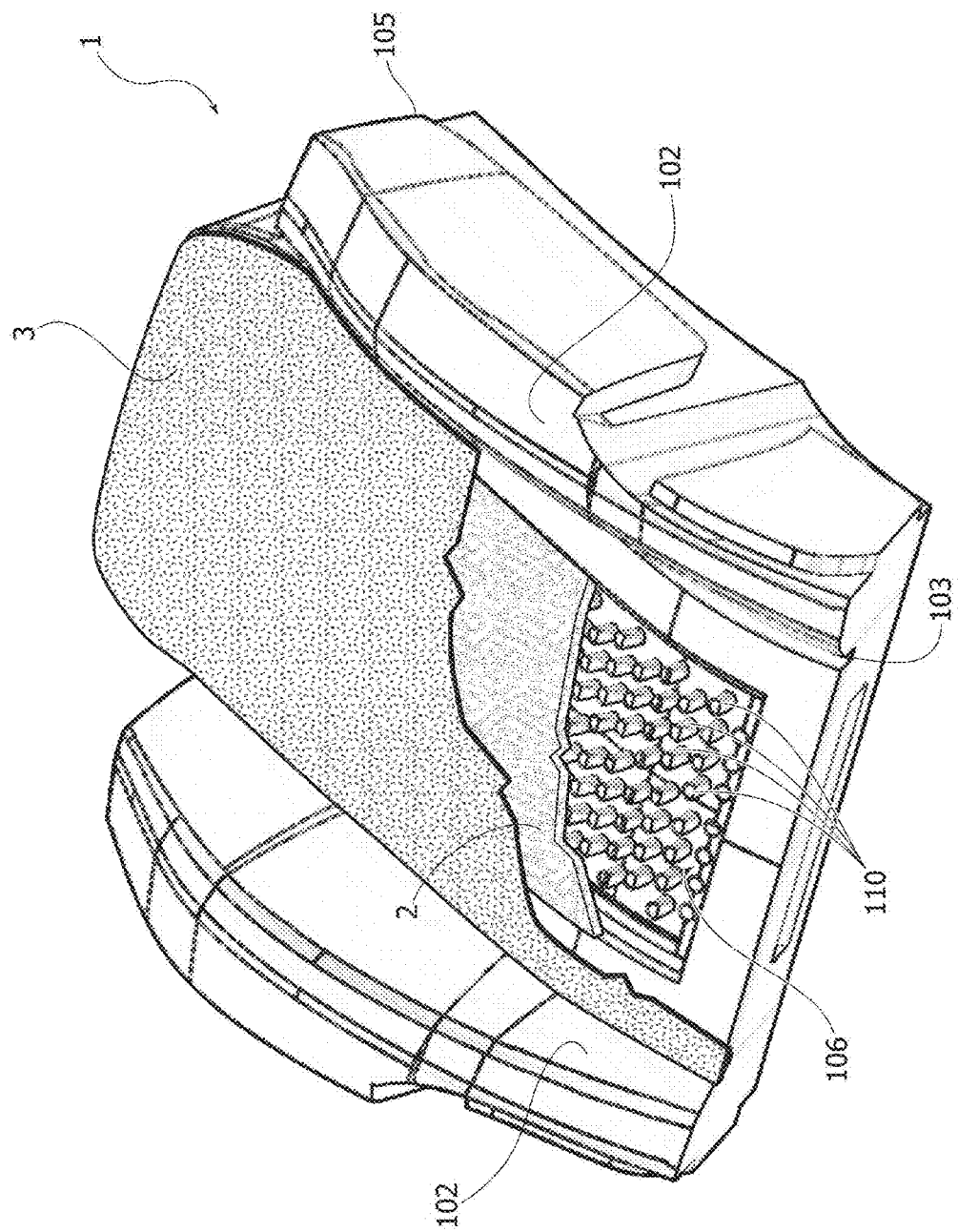
Figure 4:
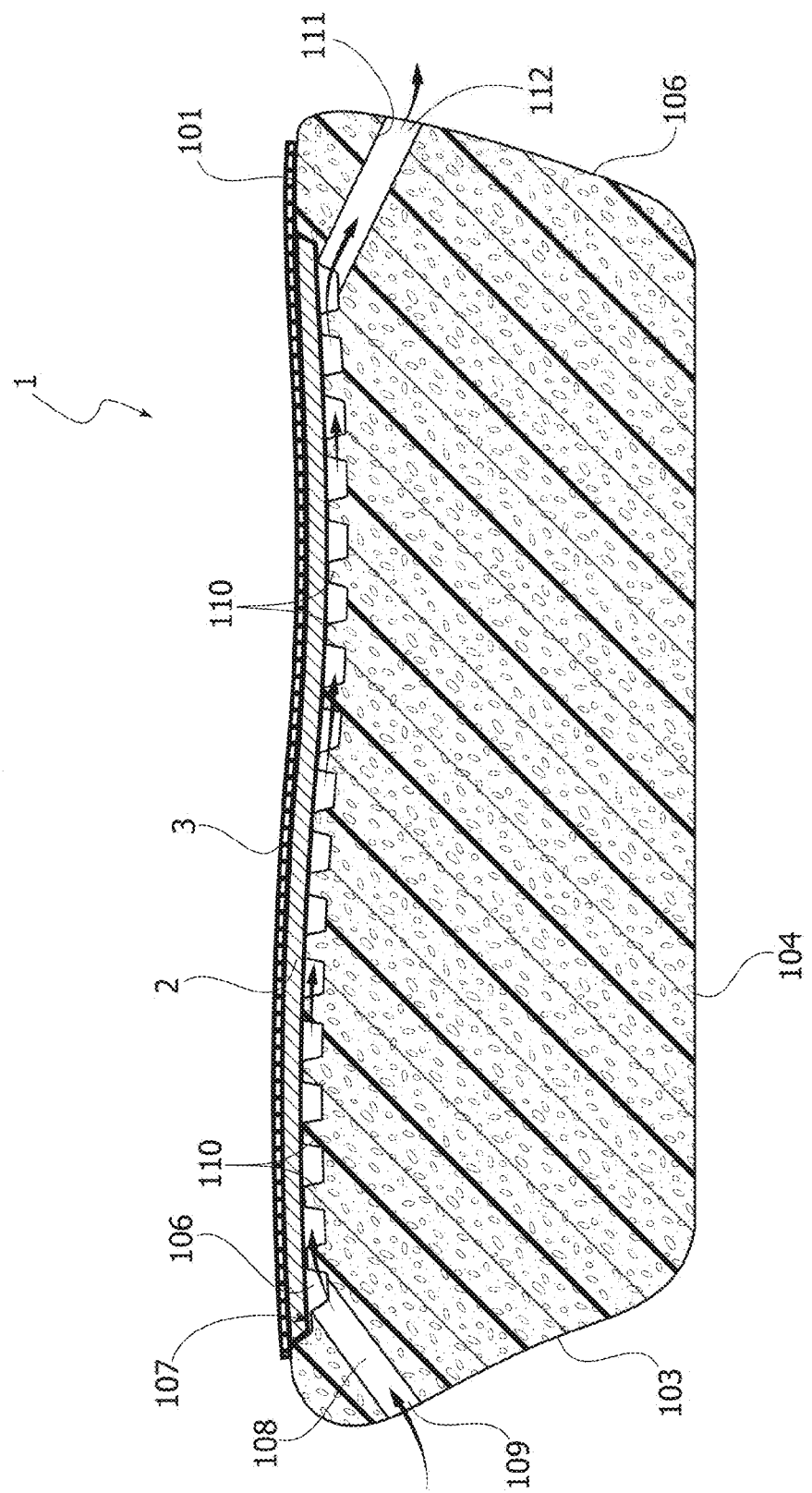
Figure 6:
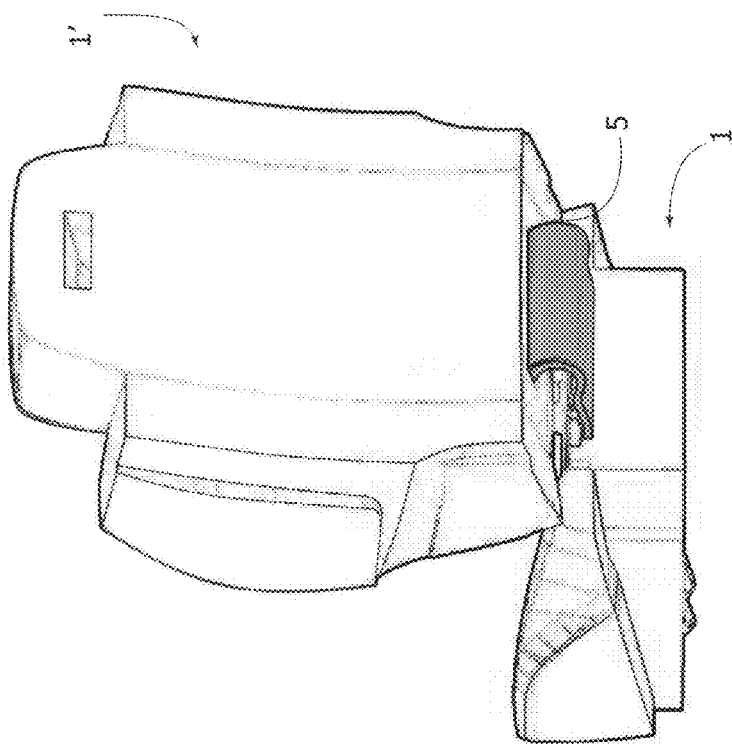
Figure 5:
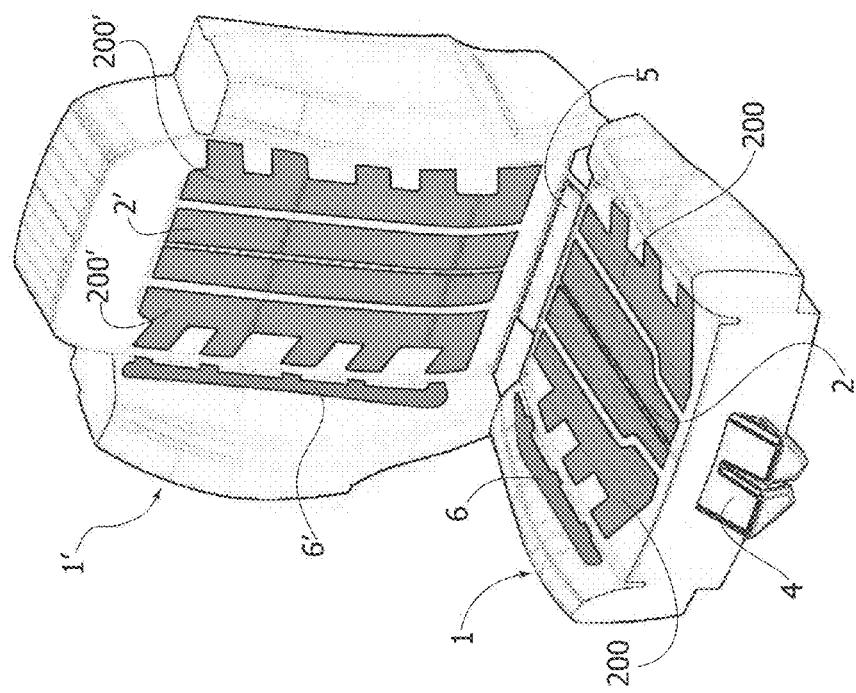
Figure 8:
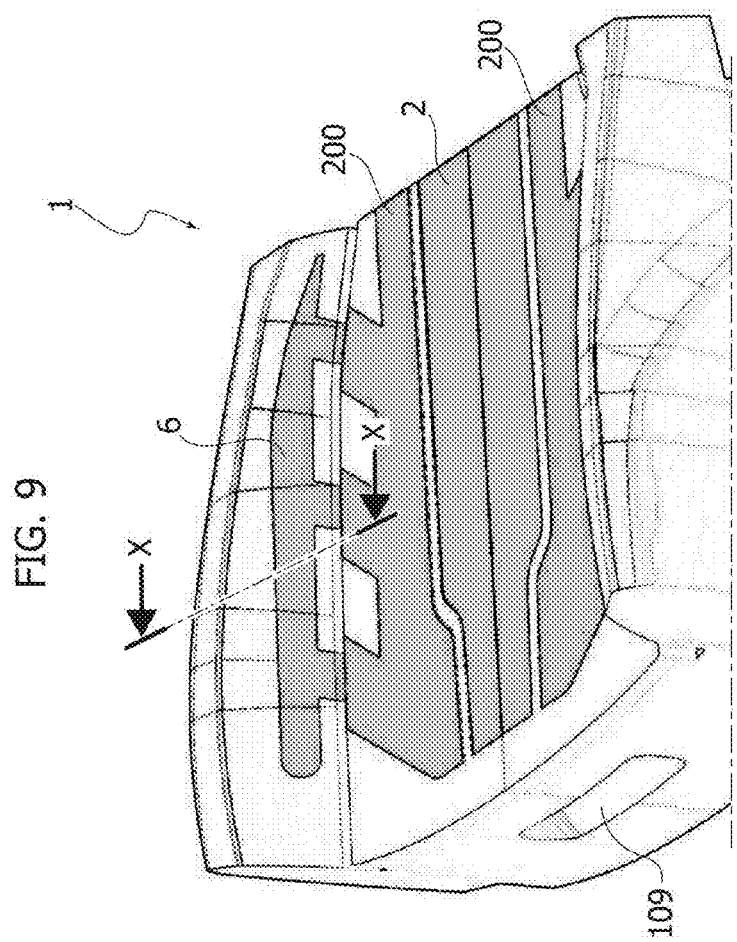
Figure 9:
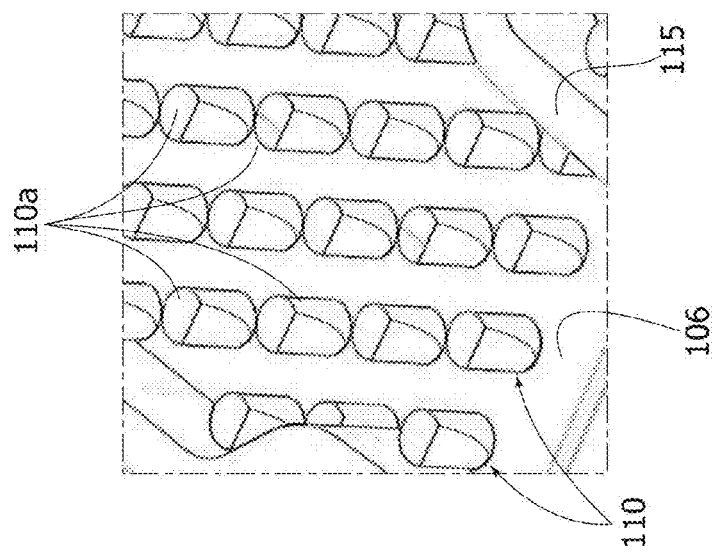
Figure 10:
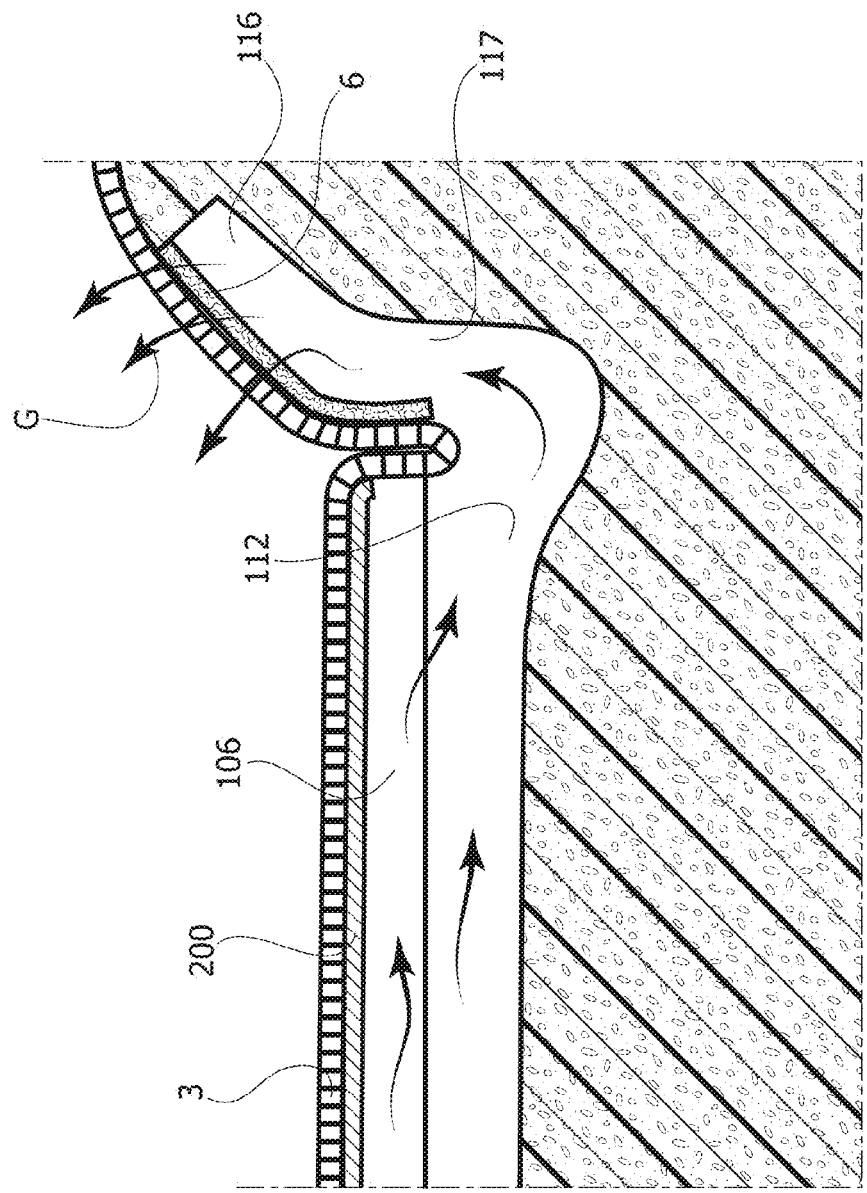
Figure 11:
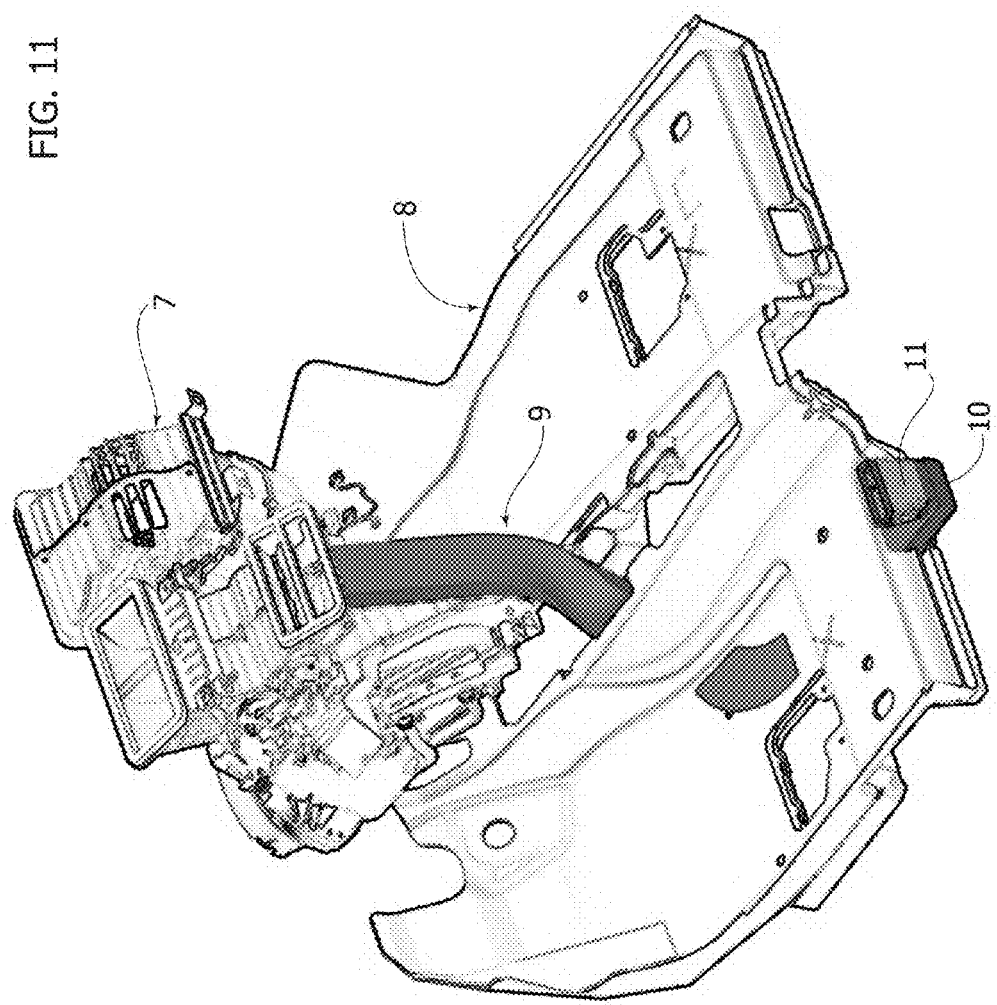
Figure 12:
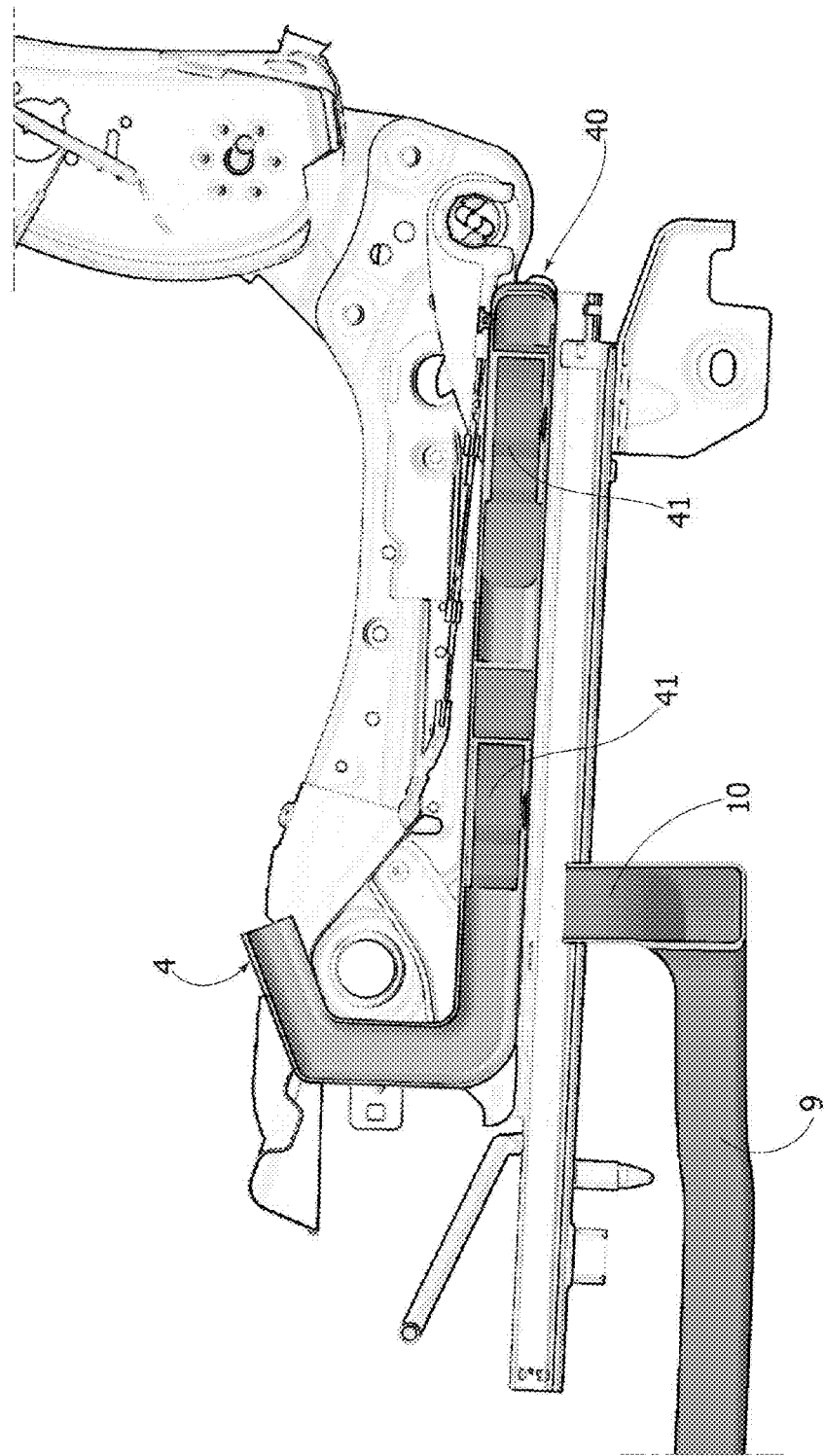
Figure 13:
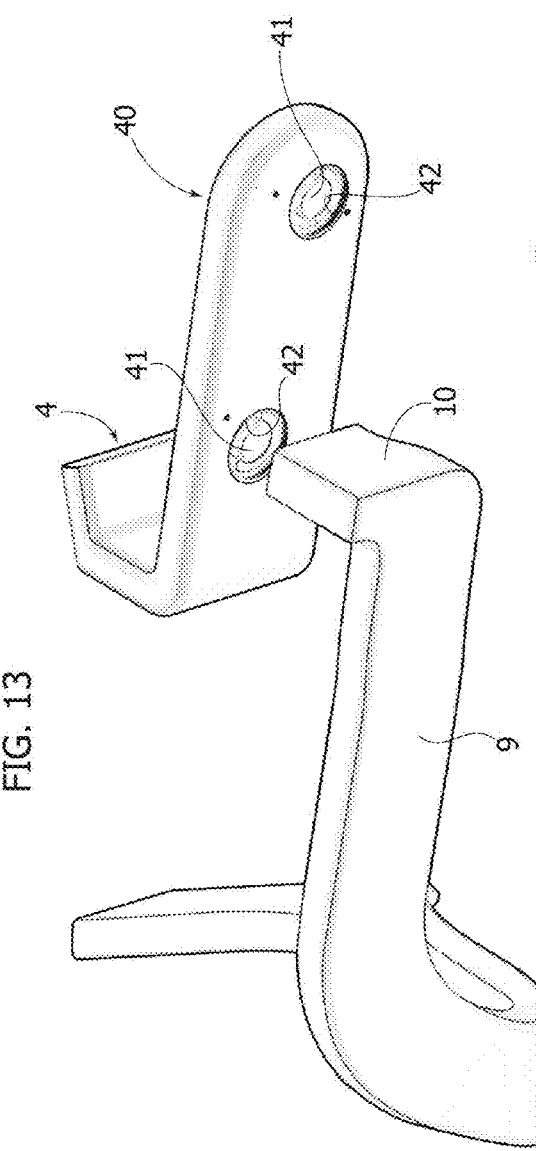
Figure 14:
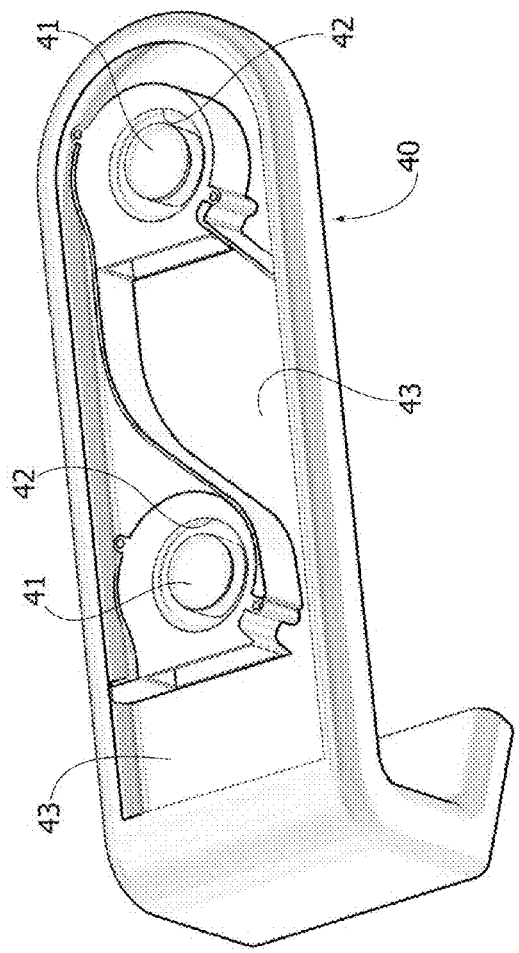
Figure 17:
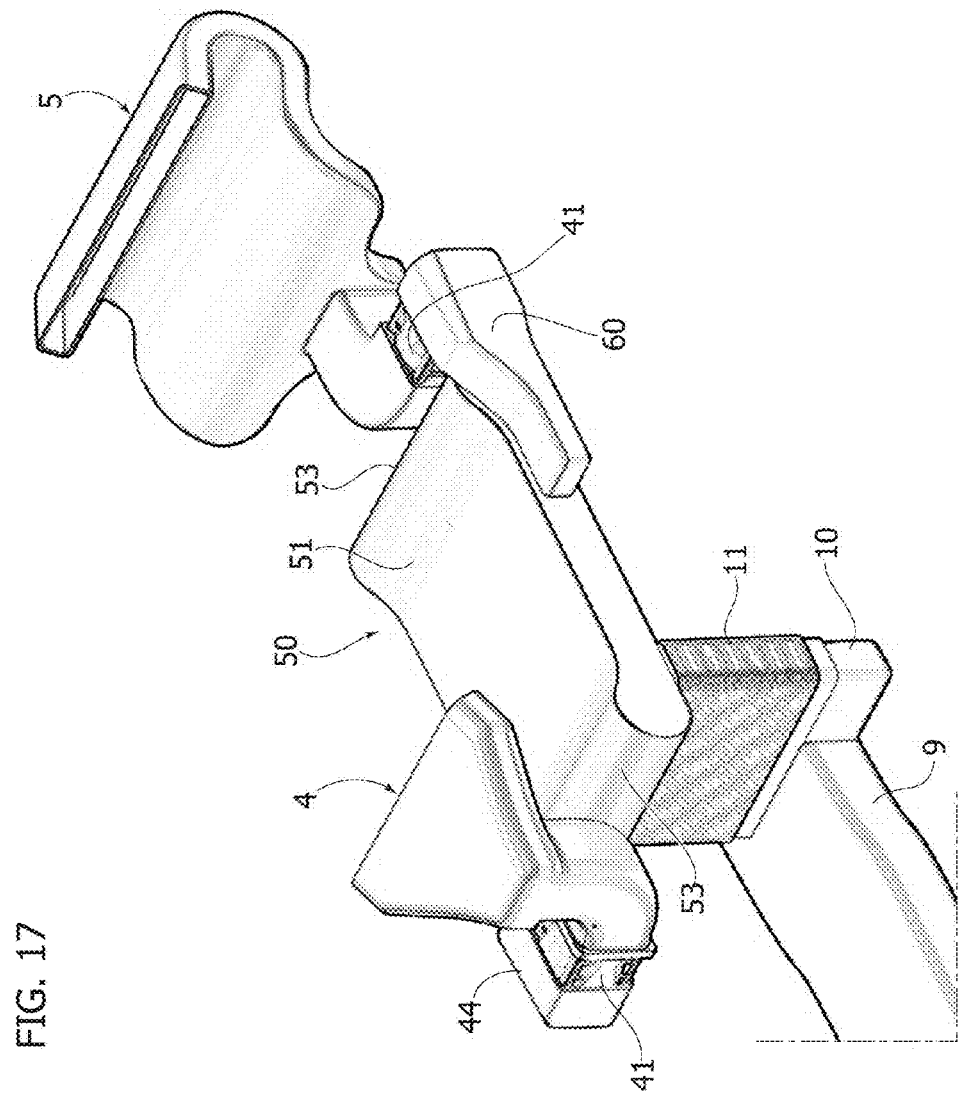
Figure 18:
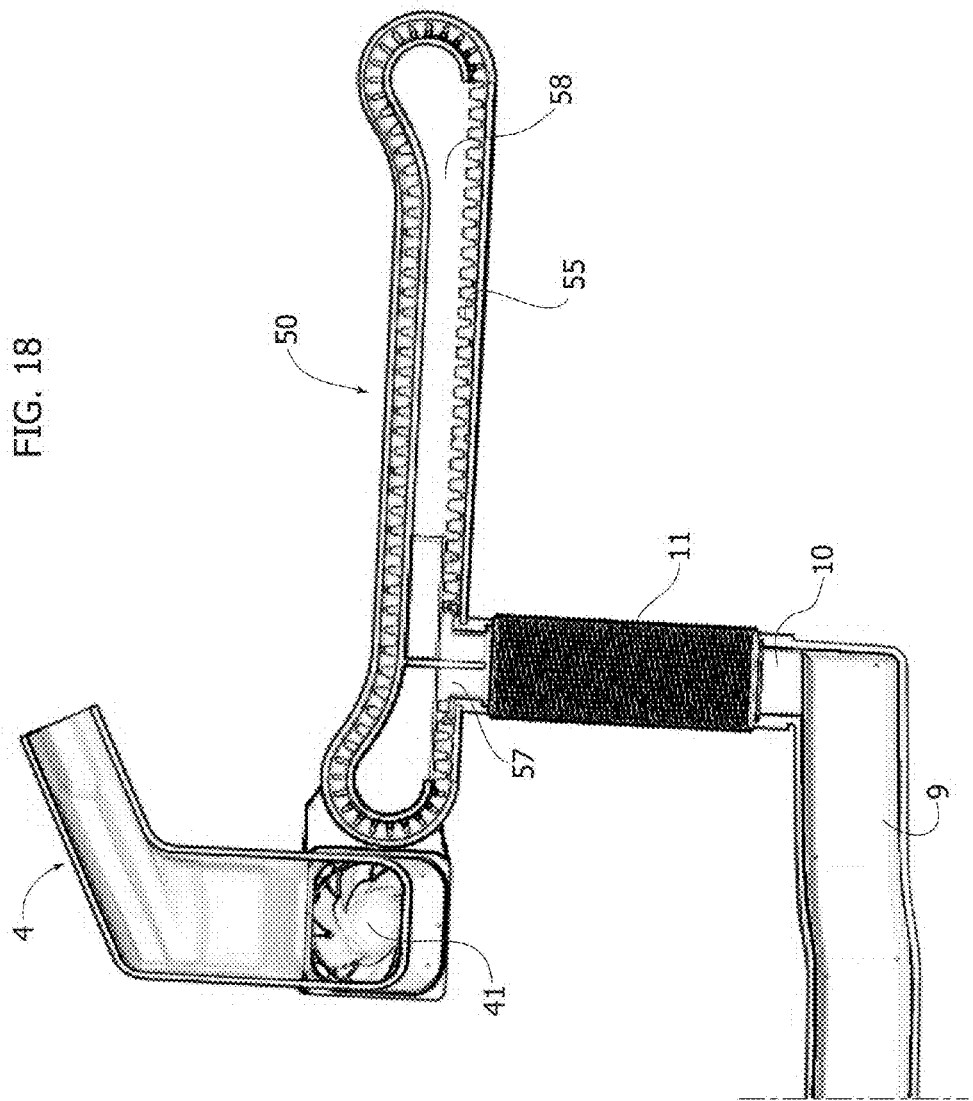
Figure 21:
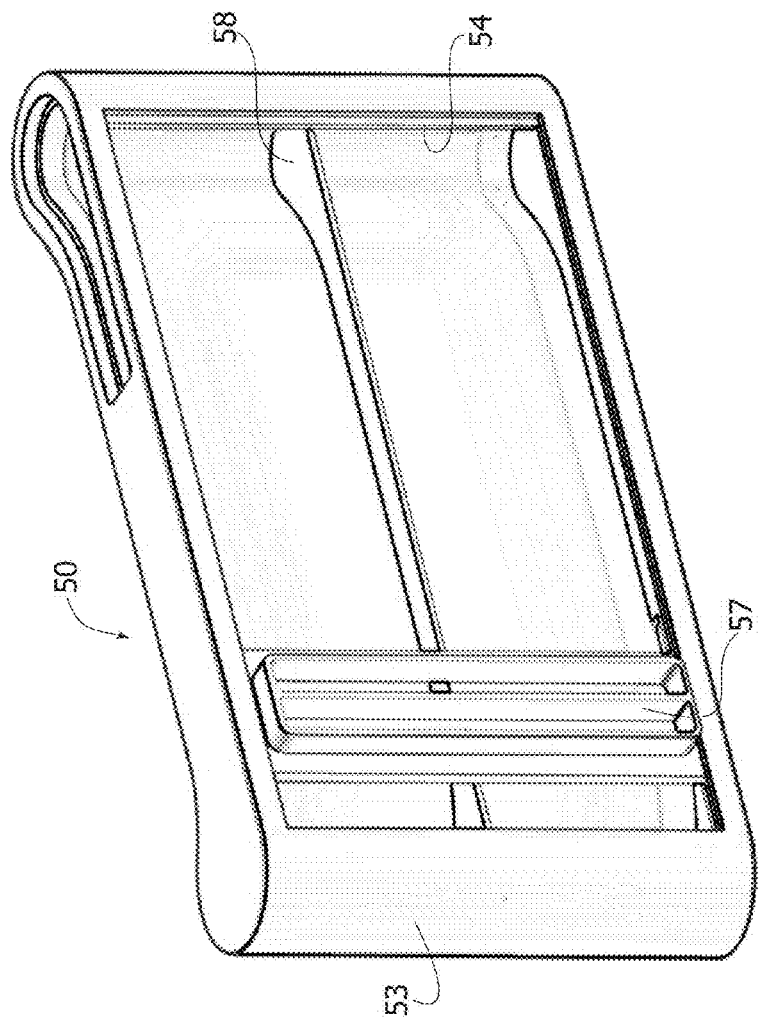

Further features and advantages of the invention will become apparent from the description which follows with reference to the annexed drawings, given purely by way of non-limiting example, in which:

FIG. 1 is a perspective view of the padding body of foamed plastic material of a motor-vehicle seat cushion, according to a first embodiment of the present invention, FIG. 2 shows the same padding body of FIG. 1 completed with a three dimensional mesh spacing fabric, including an upper layer of a material substantially impervious to air, this fabric being applied on a lowered surface portion formed in the upper surface of the padding body, for defining a cavity under said fabric which is for receiving a flow of air from the air conditioning system of the motor-vehicle, FIG. 3 shows the same padding body of FIGS. 1, 2 completed with the outer cover (shown only partially, in the central part of the cushion), FIG. 4 is a view in a longitudinal cross-section taken along line IV-IV of FIG. 3, FIGS. 5, 6 show a front perspective view and a rear perspective view of a motor-vehicle seat, according to a second embodiment of the present invention, FIG. 7 is a partial view at an enlarged scale of the padding body of the seat cushion of FIGS. 5, 6, FIG. 8 shows the detail indicated by arrow VIII in FIG. 7 at an enlarged scale, FIG. 9 shows the padding body of FIG. 7 completed with layers of material which cover the various portions of the cavities formed in the padding body, FIG. 10 is a partial cross-section view, at an enlarged scale, taken along line X-X of FIG. 9, FIG. 11 is a perspective view of a portion of the motor-vehicle floor panel on which the seat is mounted, which also shows the air conditioning unit of the motor-vehicle and the conduit for supplying conditioned air from this unit to an outlet mouth located under the motor-vehicle seat, FIGS. 12, 13 are a cross-sectional side view and perspective view from below which show a suction hood system carried by the structure of the seat according to the invention, FIG. 14 shows the suction hood of FIG. 13 at an enlarged scale and in a partially sectional perspective view from below, FIG. 15, 16 are perspective views from below of a second embodiment of the suction hood in two end positions of the longitudinal adjustment of the seat, FIG. 17 is a perspective view of a further embodiment, which makes use of a casing provided with a sleeve element associated to a wall in form of roll-up shutter slidably mounted within said casing along an endless path, FIG. 18 is a cross-sectional side view of the system of FIG. 17, FIG. 19 is a perspective view from below of the casing of FIG. 17, FIG. 20 is a partially section perspective view of the casing of FIG. 17, FIG. 21 is a further perspective view which shows the inner structure of the casing of FIG. 17, with the roller shutter removed, and FIG. 22, 23 are diagrammatic views in cross-section which show the system of FIGS. 17-21 in different operative conditions.

DETAILED DESCRIPTION OF THE INVENTION

In FIG. 1, reference 1 generally designates a body of foamed plastic material constituting the padding body of the cushion of a motor-vehicle seat, according to a first embodiment of the present invention. FIGS. 1-4 show this embodiment with reference to the seat cushion, while it is well understood that the invention is applicable also to the seat backrest, in addition or alternative to the application to the seat cushion. Therefore, the following description must be understood as applicable identically also to the case of the padding body of a seat backrest.

Also with reference to FIG. 1, the padding body 1 comprises an upper surface including a central part 101 and two lateral portions 102, as well as a front surface 103, a lower surface 104 (see FIG. 4), two lateral surfaces 105 and a rear surface 106 (see FIG. 4).

According to a conventional art, the padding body 1 is obtained by foaming a synthetic resin within a mould, by addition of a foaming agent. According to the invention, the forming mould is shaped so as to define a padding body 1 in which the central part 101 of the upper surface has a lowered surface portion 106 which is to be covered by the seat cover, so as to define a cavity for receiving a flow of air coming from the air conditioning system of the motor-vehicle.

In the embodiment which is shown here, the lowered surface portion 106 extends through a main part of the central portion 101 of the upper surface of the padding body 1. Also in the case of the illustrated embodiment, the lowered surface portion 106 has an intermediate abutment step 107 along its peripheral edge on which there is supported the peripheral edge of a panel 2 (see FIG. 2) made of any material suitable for the purposes which will be illustrated herein.

As clearly visible in FIG. 4, within body 1 there is obtained by moulding or alternatively by a machining operation subsequent to the moulding operation, a communication channel 108 which extends from the front side of the surface portion 106 to a mouth 109 opening out on the front surface 103 of the padding 1 of foamed plastic material. The mouth 109 is to be connected, in a way which will be described in detail in the following, to the system for supplying air coming from the motor-vehicle air conditioning system.

Also with reference to FIGS. 1 and 4, the body 1 of foamed plastic material is formed with an array of projections 110 which act as support elements for panel 2, which covers the lowered surface portion 106 from above.

FIG. 3 shows the body 1 of foamed plastic material completed both with panel 2 and with the seat cover 3 (which is shown here only at the central part of the upper surface of the cushion). Panel 2 is thus interposed between the cavity defined by the lowered surface portion 106 and the cover 3.

With reference to FIG. 4, in this figure there is partially illustrated in cross-section also the cover 3. In the same figure a conduit 111 is also visible which extends from the rear edge of the cavity defined between the surface portion to a mouth 112 coming out from the rear surface 106 of the body 1 of foamed plastic material.

In the case of the embodiment illustrated herein, panel 2 is made of a spacing three dimensional mesh fabric, of a type marketed under the name "3D spacing fabric", and produced by company Müller Textil GmbH. The fabric 2 is provided with an outer layer with a tighter mesh which is substantially impervious to air. An example of a fabric of this type is disclosed in document DE 199 03 070.

Therefore, the outer layer of fabric 2 constitutes a barrier to the passage of air. Therefore, even when the cover 3 is made of a fabric pervious to air, panel 2 seals the cavity under panel 2 from the outside, so that the flow of conditioned air supplied to this cavity cannot come out of the seat through the cover. However this air flow causes a heating or a cooling of panel 2 which on its turn provides a heat exchange with the body of the occupant, through the cover 3, by heat conduction.

The idea underlying the invention is exactly that of exploiting the heat conduction through a surface of the seat for heating or cooling the body of the occupant, while eliminating completely, or in any case reducing substantially the part of air which is caused to come out of the seat in order to form air jets directed towards the occupant. Therefore, the person seated on the seat of the invention will feel that his body is cooled or heated mainly for that it is in contact with a cool or hot surface, and not due to the effect of air jets coming out of the seat.

Naturally, while the illustrated example makes use of a 3D spacing fabric, this choice is merely optional, and the layer which is impervious to air can be made of any other material adapted to act as a barrier, sealing the cavity inside the seat padding body where air flows. This air impervious layer could also be constituted by the seat cover itself, or a portion thereof. Therefore, in the present description and in the following claims, where the use is specified of a layer impervious to air interposed between the cavity for the air flow and the seat cover, also the case in which the air impervious layer entirely or partially constitutes the seat cover itself is also meant as being included.

Also with reference to FIGS. 1-4, the solution disclosed therein is also applicable, as already indicated, to the seat backrest, in which case the above described structure can remain the same, while considering in that in the case of the backrest the surface which has the lowered surface portion, defining the cavity for the air flow, is the front surface of the backrest.

FIGS. 5-10 show a second embodiment in which the invention is applied both to the cushion and to the backrest of the seat, while it is well understood that an application only to the cushion or only to the backrest would also be possible.

In FIGS. 5-10, parts corresponding to those shown in FIGS. 1-4 are designated by the same reference numerals. Furthermore, the parts of the padding body of the backrest corresponding to the parts of the padding body of the cushion are designated by the same reference numeral, except for the addition of an apex.

FIGS. 5, 6 show both the padding body 1 of the seat cushion and the padding body 1' of the backrest. Also in this case the padding body 1 of the cushion is formed with an upper surface having a lowered surface portion 106, whose configuration is clearly shown in FIG. 7. Also with reference to FIG. 7, the cavity defined by the lowered surface portion 106 communicates with a supply mouth 109 opening on a front surface 103 of the padding body.

FIG. 5 also shows a connecting duct 4 which is mounted within mouth 109 and forms part of the system for supplying air into the seat which will be described in detail hereinafter. Furthermore, FIGS. 5, 6 show a flexible flat duct 5 which communicates the cavity formed within the padding body 1 of the cushion with a similar cavity (not shown in the drawings) formed in the padding body 1' of the backrest.

Also with reference to FIG. 7, in the illustrated example the lowered surface portion 106 is formed with a central portion having the array of supporting projections 110 which have been already described with reference to the embodiment of FIGS. 1-4.

The lowered surface portion 106 further has lateral portions defining channels 112 for supplying air towards the lateral portions of the cushion. The channels 112 extend between projecting portions 113 having edges with lowered steps 114. Furthermore, the central part of the lowered surface portion 106, having the supporting projections 110, has two lateral areas separated from a central area by two longitudinal walls 115 which are also formed by moulding in the upper surface of the padding body 1 of foamed plastic material.

FIG. 8 shows an enlarged detail of the projections 108. As shown, each of these projections has a substantially cylindrical and/or ellipsoidal shape, with a circular and/or elliptical base, also with a front bevelled planar surface which is inclined for example at 110° (alternatively a circumferential bevel can be provided), whose function is two-fold: deviating the air flow upwardly for cooling or heating the outer cover 3 (see FIG. 3) and avoiding an undesired collapse of the projections under the weight of the occupant. If the bevel is not provided, the projections may collapse more easily, with a resulting risk of closing the channels for the air passage.

FIG. 9 shows the same padding body of FIG. 7 completed with the addition of layers of material which cover the lowered surface portion 106 at the top. More precisely, the central part of the surface portion 106, located between the two longitudinal walls 115 is covered by a panel 2 constituted by a 3D spacing fabric of the type described above, with an outer layer which is substantially impervious to air. Also in FIG. 9 by 200 there are designated two further layers of a material substantially impervious to air, such as synthetic material, which cover the lowered surface portions at the two sides of walls 115, as well the channels 112. As shown, layers 200 have a shape corresponding to that of the surface to be covered and rest over the steps 114 (FIG. 7) defined on body 1, as well on the supporting projections 110.

Also with reference to FIG. 9, by 116 there are designated lowered surface portions formed in the lateral portions of body 1. The lowered surface portions 116 communicate with the channels 112 which have been described above through further channels 117, which are also formed in the surface of the lateral portions of the padding body 1. By 6 there are designated auxiliary layers of a material which is instead pervious to air, covering channels 117 and the lowered surface portions 116.

Due to the above described arrangement, the layers of material 2 and 200 act as barriers against the passage of air and constitute walls which are cooled or heated by the air which flows under them, so as to cool or to heat the body of the occupant by thermal conduction through the seat cover. At the same time, the air which flows through channels 112, 117 may instead pass through layers 6 of the material pervious to air, which therefore generate lateral air jets directed towards the body of the occupant.

Therefore, in the embodiment of FIGS. 5-10, a hybrid solution is provided, with the upper surface of the seat cushion which has a central portion constituting a hot or cool wall which heats or cools the body of the occupant by thermal conduction whereas from the lateral portions of the cushion cool or hot air jets are ejected, which flow on the body of the occupant.

In one variant, also the panel 2 which is impervious to air is formed with a series of through holes, for generating a plurality of localized air jets, which are directed towards the occupant. Obviously in this case it is important that the outer cover 3 is of a material pervious to air, such as fabric.

The same arrangement shown in FIG. 9 for the seat cushion is used, as shown in FIG. 5, also for the padding body 1' of the backrest.

FIG. 10 shows in cross section the detail of a layer 200 substantially impervious to air which separates the underline cavity from the cover 3 (which for example may be made of fabric); the same figure also shows the layer 6 of a material pervious to air (such as fabric) interposed between the cover 3 and the lowered surface portions 116 and 117. The arrows in this figure show the portion of the air flow which travels through channels 112, 117 and reaches the cavity portion defined by surface 116, from which air can flow through the pervious layer 6 and the cover 3 so as to generate lateral air jets G which are directed towards the body of the occupant. At the same time, layer 200 which is impervious to air acts as a cooling or heating wall, which cools or heats the body of the occupant by thermal conduction. FIGS. 11-25 show simple and functional embodiments of the system for supplying the flow of air coming from the motor-vehicle air conditioning system into the seat.

In FIG. 11, numeral 7 generally designates an air conditioning unit of any known type, supported inside the motor-vehicle passenger compartment by the structure of the vehicle. Numeral 8 designates the motor-vehicle floor panel, of which the figure shows the portion extending at the rear of the area where the air conditioning unit 7 is mounted. According to a technique known per se, unit 7 has a conditioned air outlet which is in communication with a duct 9 ending with an outlet mouth 10 located in an area of the floor panel which is located below the structure of the driving seat of the motor vehicle.

Naturally, while the invention is shown here as applied only to the driving seat, it could be theoretically applied to any seat of the motor-vehicle. It is observed that FIG. 11 shows an outlet mouth 10 provided with a flexible and extendable duct 11. However, in the embodiment which is shown in FIGS. 12-18, the flexible duct 11 is not necessary.

FIG. 12 shows the lower part of the frame of the motor-vehicle driving seat mounted above longitudinal guides 12 of any known type, which on their turn are carried by the structure of the floor panel 8 through brackets 13.

In FIG. 12, numeral 4 designates the communication duct (already mentioned with reference to FIG. 5) which is for supplying conditioned air inside the cavity formed in the padding body 1 of the seat cushion.

FIG. 12 does not show the padding body 1, which can be made for example according to the solution of FIGS. 5-10, or also according to the solution of FIGS. 1-4. In any case, the communication duct 4 has a substantially C-shaped configuration, with an upper end inserted into mouth 109 (FIG. 4, FIG. 7) formed in the padding body of the cushion, and a lower end which is for receiving air coming from the outlet mouth 10.

To this end, the communication duct 4 defines with its lowered end a suction hood 40, provided with two suction fans 41. In the embodiment of FIGS. 12-14, the suction hood 40 has a body in form of closed box with two lower mouths 42 through which fans 41 axially draw air coming from the outlet mouth 10 for supplying this air towards the upper end of the duct. FIG. 14 (where the lower wall of hood 40 has been removed) shows an example of the arrangement of the two fans 41 adapted to axially draw air coming from mouth 10 and to direct this air in a centrifugal direction into channels 43 which merge into duct 4.

As shown, the hood 40 has a major dimension along the longitudinal direction of the motor-vehicle and is provided with two fans 41 which are also spaced apart along the longitudinal direction of the motor-vehicle, to ensure that at least one of the two suction fans 41 is located in proximity of the outlet mouth 10 whatever is the position of longitudinal adjustment of the seat. The fans 41 further have sufficient power to ensure proper supply of air also when the seat is located in an adjustment position which is more raised relative to the floor panel.

FIGS. 15, 16 show a second embodiment of hood 40, in which this hood 40 is constituted by a hood element, opened at its bottom and having a major dimension along the longitudinal direction of the motor-vehicle, to ensure that a portion of the hood element 40 is located above the outlet mouth 10 for any position of the seat along the longitudinal direction of the motor-vehicle. The two FIGS. 15 and 16 respectively relate to the most rearward position and the most forward position of the seat. In FIG. 16 the shape of the hood 40 is slightly different with respect to the case of FIG. 15, with the vertical wall of the hood which in the case of FIG. 16 is of a substantially constant height and not tapered as in the case of FIG. 15.

The drawing of air coming from mouth 10 by the hood 40 is ensured, in the case of FIGS. 15, 16, by a pair of axial fans 41, arranged in parallel with their axes directed in the longitudinal direction of the motor-vehicle. The fans 41 as arranged at one end of the hood 40 which communicates to the duct 4. The duct 4 attends to supplying the drawn air towards cavity 106 formed in the padding body 1 of the seat cushion.

FIGS. 17-21 show an alternative system for guiding the air flow inside the seat. In this case the communication duct 4 has one end (which in the illustrated example has a configuration with an enlarged mouth) which is to be inserted into the front mouth 109 of the padding body 1 of the seat cushion and the opposite end which communicates, through a suction fan 41, with an outlet connection 42 of a hollow casing 50, in form of flattened box.

The casing 50 has an upper wall 51, two lateral walls 52 and two rounded end walls 53. On the lower side, the casing 50 has an aperture 54 (FIG. 21) which is closed by a wall 55 in form of a roll-up shutter. The shutter 55 is constituted by a web of mutually articulated rods 56 guided along an endless path inside casing 50 and having its opposite ends both connected to a sleeve element 57 which defines the inlet mouth for the air into the seat. As shown in FIGS. 17, 18, the inlet mouth 57 is connected to the outlet mouth 10 by a flexible and extendable duct 11.

Also with reference to FIGS. 20 and 21, the casing 50 has a longitudinal partition 58 which divides the inner cavity of casing 50 into two separate chambers arranged side by side, from which the air flow is directed respectively towards the cushion and towards the backrest. The partition 58 is carried by a wall arranged inside the shutter 55 and carried by the lateral walls 52.

One of these chambers communicates with said connecting element 44 through an aperture 59 (FIG. 21) formed on one side of casing 50. Casing 50 has an aperture similar to aperture 59 shown in FIG. 21 on its opposite side and at its opposite end, this further aperture being in communication with a connecting element 60 for supplying air, through a suction fan 41', to a flattened air guiding duct 5, similar to that shown in FIGS. 5, 6, which is for supplying an air flow to the cavity formed in the padding body of the seat backrest.

Therefore, as shown, in the embodiment described herein, the cavities of the padding bodies of the seat cushion and seat backrest are supplied in parallel, and not in series, by the air guiding system arranged within the seat.

As shown in FIGS. 22, 23, the flexible and extendable duct 11 and the roll-up shutter 55 ensure proper communication of the outlet mouth 10 with the inlet mouth 57 whatever is the adjustment position of the seat along the longitudinal and vertical directions of the vehicle. The height variations are compensated by the flexibility of duct 11, whereas the variations of the longitudinal position are compensated also because mouth 57 can be moved longitudinally with respect to the body of casing 50.

As it is clearly apparent from the foregoing description, the motor-vehicle seat according to the present invention provides cooling or heating of the body of the occupant exploiting mainly a thermal conduction effect. Furthermore, various embodiments have been described herein which reach this purpose with a structure and an arrangement which are particularly simple and functional.

The solution described with reference to FIGS. 11-23, relating to the system for supplying an air flow inside the cavity provided within the padding body of the seat, are in general applicable independently from how the air supplied into the seat is then used to cool or heat the occupant and therefore also independently from the solution forming the subject of claim 1.

Naturally while the principle of the invention remains the same, the details of construction and the embodiments may widely vary with respect to what has been described and illustrated purely by way of example, without departing from the scope of the present invention, as defined in the appended claims.

What is claimed is:

1. A motor-vehicle seat, comprising:
  a seat cushion, and
  a seat backrest,
  wherein each of said seat cushion and seat backrest comprises:
    a padding body constituted of foamed plastic material, and
    a cover applied on said padding body,
  wherein in the padding body of at least one of said seat cushion and seat backrest is formed a passage for a flow of air coming from an air conditioning system of the motor-vehicle,
  wherein said passage for the air coming from the air conditioning system of the motor-vehicle comprises a cavity defined between said cover and a lowered surface portion formed in an outer surface of the padding body,
  wherein at least part of said cavity is separated from the cover through a layer of a material substantially impervious to air, adapted to exchange heat by thermal conduction through said cover, with a body of an occupant,
  wherein said layer of material substantially impervious to air covers a central portion of said lowered surface, and wherein said lowered surface includes lateral portions formed in lateral portions of said padding body on which said cover is applied with interposition of layers of a material pervious to air, so that part of the air flow supplied within said cavity comes out from the lateral portions of the seat through said layers of air-pervious material and through the cover, the latter being also of a material pervious to air, whereas at the central portion of the padding body said layer of material substantially impervious to air exchanges heat by thermal conduction, through said cover with the body of the occupant, and
  wherein said substantially air impervious layer has a plurality of holes for passage of air, for generating localized air jets.

2. The seat according to claim 1, wherein said lowered surface has a plurality of supporting projections and that on said projections there is supported a three dimensional mesh spacing fabric, having an outer layer constituting said layer of material substantially impervious to air.

3. The seat according to claim 2 wherein said layer of a material substantially impervious to air covers an entire extension of said lowered surface.

4. The seat according to claim 1, wherein:
  said cavity of the padding body is connected to the air conditioning system of the motor-vehicle by an air supply line which extends from the motor-vehicle air conditioning system to an outlet mouth located above a floor panel of the motor-vehicle and arranged under the motor-vehicle seat,
  said outlet mouth located above the motor-vehicle floor panel communicates with an air guiding line carried by the seat, which extends from an inlet mouth located under the seat to said cavity formed in the padding body,
  said outlet mouth located above the motor-vehicle floor panel and said inlet mouth located under the seat are in fluid communication with each other by an auxiliary connecting system which maintains said communication in different adjustment positions of the seat relative to the floor panel, both along longitudinal and vertical directions.

5. The seat according to claim 4, wherein said outlet mouth located above the motor-vehicle floor panel and said inlet mouth located under the seat are not mechanically connected with each other, said auxiliary connecting system comprising a suction hood device associated to the inlet mouth.

6. The seat according to claim 5, wherein said suction hood device comprises a closed casing with a lower wall facing the outlet mouth having two inlet apertures provided with respective suctions fans, said apertures being spaced from each other along the longitudinal direction of the motor-vehicle, to an extent such that at least one of these apertures is located in proximity of said outlet mouth in any position of the longitudinal adjustment of the seat.

7. The seat according to claim 6, wherein said outlet mouth is connected by a flexible and extendable duct to said inlet mouth and in that said inlet mouth is defined by a sleeve element movable longitudinally along a flat lower wall of a hollow casing, said sleeve element being associated with a wall in form of a roll-up shutter, slidably mounted along an endless path within said casing.

8. The seat according to claim 7, wherein said casing has an inner cavity separated by a longitudinal partition into two chambers arranged side by side which are respectively communicated to cavities formed in the padding body of the seat cushion and the seat backrest.

9. The seat according to claim 5, wherein said suction hood device has an opened lower side, facing said outlet mouth and having a longitudinal extension sufficient to have a portion thereof located above said outlet mouth in any position of the longitudinal adjustment of the seat, at least one suction fan being provided at one end of the suction hood device which is in communication with said cavity formed in the padding body of the seat.

* * * * *